(12) United States Patent
Fukano et al.

(10) Patent No.: US 8,973,452 B2
(45) Date of Patent: Mar. 10, 2015

(54) ELECTRIC ACTUATOR

(71) Applicant: SMC Kabushiki Kaisha, Chiyoda-ku (JP)

(72) Inventors: Yoshihiro Fukano, Moriya (JP); Shoichi Makado, Moriya (JP); Hiroyuki Shiomi, Kitasouma-gun (JP)

(73) Assignee: SMC Kabushiki Kaisha, Chiyoda-ku (JP)

( * ) Notice: Subject to any disclaimer, the term of this patent is extended or adjusted under 35 U.S.C. 154(b) by 86 days.

(21) Appl. No.: 13/688,587

(22) Filed: Nov. 29, 2012

(65) Prior Publication Data
US 2013/0174679 A1 Jul. 11, 2013

(30) Foreign Application Priority Data

Jan. 11, 2012 (JP) ................. 2012-002641

(51) Int. Cl.
| | | |
|---|---|---|
| *F16H 27/02* | (2006.01) | |
| *F16H 25/20* | (2006.01) | |
| *H02K 7/06* | (2006.01) | |
| *H02K 5/12* | (2006.01) | |
| *F16H 25/22* | (2006.01) | |
| *F16H 25/24* | (2006.01) | |

(52) U.S. Cl.
CPC .................. *F16H 25/20* (2013.01); *H02K 7/06* (2013.01); *H02K 5/12* (2013.01); *F16H 25/2204* (2013.01); *F16H 25/2418* (2013.01); *F16H 2025/2034* (2013.01)
USPC ........................................ 74/89.34; 318/432

(58) Field of Classification Search
USPC ........................................................ 74/89.4
See application file for complete search history.

(56) References Cited

U.S. PATENT DOCUMENTS

| | | | | |
|---|---|---|---|---|
| 4,854,444 | A * | 8/1989 | Iwamoto .................... | 198/750.7 |
| 5,484,051 | A * | 1/1996 | Nagai et al. ................ | 198/750.7 |
| 5,637,940 | A * | 6/1997 | Nagai et al. ...................... | 310/80 |
| 5,689,994 | A * | 11/1997 | Nagai et al. .................. | 74/89.32 |
| 5,713,244 | A * | 2/1998 | Ito et al. ..................... | 74/490.09 |
| 5,747,896 | A * | 5/1998 | Nagai et al. ...................... | 310/20 |
| 5,799,543 | A * | 9/1998 | Nagai et al. ................ | 74/490.09 |
| 6,000,292 | A * | 12/1999 | Nagai et al. .................. | 74/89.33 |
| 6,142,030 | A * | 11/2000 | Nagai et al. .................. | 74/89.32 |
| 6,308,821 | B1 * | 10/2001 | Asai et al. ................... | 198/750.7 |
| 6,346,788 | B1 * | 2/2002 | Nagai et al. ..................... | 318/432 |
| 6,370,975 | B1 * | 4/2002 | Nagai et al. .................. | 74/89.25 |
| 6,655,225 | B1 * | 12/2003 | Nagai et al. .................. | 74/89.33 |

(Continued)

FOREIGN PATENT DOCUMENTS

| | | | | |
|---|---|---|---|---|
| JP | 5-16092 | | 1/1993 | |
| JP | 05016092 | A * | 1/1993 | ............... B25J 19/00 |
| JP | 2004-156636 | | 6/2004 | |

*Primary Examiner* — David M Fenstermacher
*Assistant Examiner* — Zakaria Elahmadi
(74) *Attorney, Agent, or Firm* — Oblon, McClelland, Maier & Neustadt, L.L.P.

(57) ABSTRACT

In a body of an electric actuator, dust collecting pipes are disposed as a pair along an axial direction of a hole portion of the body. The dust collecting pipes are connected respectively to negative pressure supply ports provided in an end block, and include plural first through fifth suction holes separated mutually along an axial direction of the dust collecting pipes. Distances between the first through fifth suction holes are formed so as to become smaller stepwise from one end side of the dust collection pipes, on the side of the negative pressure supply ports, to the other end side thereof.

10 Claims, 4 Drawing Sheets

(56) References Cited

U.S. PATENT DOCUMENTS

| | | | |
|---|---|---|---|
| 6,656,133 B2* | 12/2003 | Voegele et al. | 600/568 |
| 6,807,877 B2* | 10/2004 | Sato et al. | 74/89.37 |
| 6,880,417 B2* | 4/2005 | Nagai et al. | 74/89.36 |
| 7,070,041 B1* | 7/2006 | Dirschbacher et al. | 198/750.1 |
| 7,520,191 B2* | 4/2009 | Nagai et al. | 74/89.33 |
| 7,878,082 B2* | 2/2011 | Yamagishi | 74/89.33 |
| 7,922,613 B2* | 4/2011 | Iida | 474/140 |
| 8,561,491 B2* | 10/2013 | Fukano et al. | 74/89.32 |
| 8,650,977 B2* | 2/2014 | Takahashi et al. | 74/89.34 |
| 2005/0011291 A1* | 1/2005 | Nagai et al. | 74/89.32 |
| 2009/0260463 A1* | 10/2009 | Fukano et al. | 74/89.33 |
| 2009/0260464 A1* | 10/2009 | Holker et al. | 74/89.33 |
| 2010/0162838 A1* | 7/2010 | Hirai et al. | 74/89.33 |
| 2013/0112022 A1* | 5/2013 | Shimizu | 74/89.34 |

\* cited by examiner

ELECTRIC ACTUATOR

CROSS-REFERENCE TO RELATED APPLICATION

This application is based upon and claims the benefit of priority from Japanese Patent Application No. 2012-002641 filed on Jan. 11, 2012, the contents of which are incorporated herein by reference.

BACKGROUND OF THE INVENTION

1. Field of the Invention

The present invention relates to an electric actuator, which is capable of moving a displaceable body by communicating a driving force of a drive unit to the displaceable body via a screw shaft.

2. Description of the Related Art

Heretofore, as a means for transporting workpieces or the like, an electric actuator has widely been used for displacing a slider that transports a workpiece, in which a feed screw is driven rotatably by a rotary drive force of a rotary drive source such as a motor or the like. Such an electric actuator, for example, as disclosed in Japanese Laid-Open Patent Publication No. 2004-156636, comprises a body, a ball screw disposed rotatably in the interior of the body, a nut, which is screw-engaged via balls with the ball screw, and a displaceable body, which is connected to the nut. The nut is displaced together with the displaceable body along an axial direction by rotating the ball screw under a driving action of the electric motor.

In the case that the aforementioned electric actuator is used in a clean room, for example, for performing semiconductor manufacturing, since dust, debris or the like tends to be generated due to frictional wear of the ball screw, the balls, and the nut, which are enmeshed mutually with each other, there is a need to prevent such dust or the like from being discharged to the exterior.

For example, as a dust collecting structure for preventing dust or the like from being discharged to the exterior, as disclosed in Japanese Laid-Open Patent Publication No. 05-016092, an electric actuator is known having a ball screw accommodated in the interior of a casing, and a dust collecting pipe in which plural suction holes are formed, and which is disposed in the vicinity of a slit that opens on an upper portion of the casing. By supplying a negative pressure fluid to the dust collecting pipe, dust or the like from the interior of the casing is aspirated through the suction holes.

SUMMARY OF THE INVENTION

However, with the aforementioned dust collecting structure, the dust collecting pipe is disposed on the exterior of the casing, and since the dust collecting structure is configured to aspirate dust or the like through a slit that opens upwardly on the casing, the dust or the like is temporarily discharged to the exterior of the casing. Consequently, this structure is not suitable for use in a clean room or the like. Further, with the dust collecting pipe, one end thereof is connected to a vacuum pump that serves as a negative pressure supply source, and a negative pressure fluid is supplied to the other end from the one end of the dust collecting pipe. However, because multiple suction holes are arranged so as to be separated mutually by equal distances, the aspirated amount of dust or the like, which is drawn in through the suction holes on the other end on a back end side is smaller than the aspirated amount drawn in through the suction holes on the one end on the front end side. As a result, it becomes difficult for dust or the like to be aspirated evenly and uniformly along the axial direction of the dust collecting pipe, dust or the like cannot be removed from the back side of the casing which is distanced farthest away from the negative pressure source, and dust or the like remains deposited in the casing.

A general object of the present invention is to provide an electric actuator that is capable of aspirating dust or the like generated in the interior of a body evenly and uniformly along an axial direction of the body, and preventing the dust or the like from being discharged to the exterior reliably.

The present invention is characterized by an electric actuator comprising a body, a drive unit which is driven rotatably upon being energized by an electric current, a displacement mechanism disposed in the body and having a screw shaft rotated by a drive force of the drive unit, and a displaceable body screw-engaged with the screw shaft and displaced along an axial direction of the body, a negative pressure supply port formed in the body and to which a negative pressure fluid is supplied, and a negative pressure supply pipe disposed in the interior of the body and into which the negative pressure fluid is supplied from the negative pressure supply port, wherein the negative pressure supply pipe includes at least three suction holes separated mutually along the axial direction, and distances between adjacent suction holes are set to become smaller stepwise as the suction holes are distanced further from the negative pressure supply port.

According to the present embodiment, negative pressure supply pipes through which a negative fluid is supplied are disposed in the interior of the body, and negative pressure fluid is supplied to the negative pressure supply pipes from negative pressure supply ports formed in the body. Together therewith, suction holes, at least three of which are provided in each of the negative pressure supply pipes, are separated mutually along the axial direction of the negative pressure supply pipes, and the distances between adjacent suction holes are set to become smaller stepwise as the suction holes are distanced further from the negative pressure supply ports. As a result, when dust or the like in the interior of the body is aspirated through the multiple suction holes, negative pressure fluid can be supplied evenly and uniformly to the interior of the body along the axial direction of the negative pressure supply pipes, irrespective of the distance from the negative pressure supply ports, and dust or the like generated in the interior is aspirated and removed reliably and uniformly.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
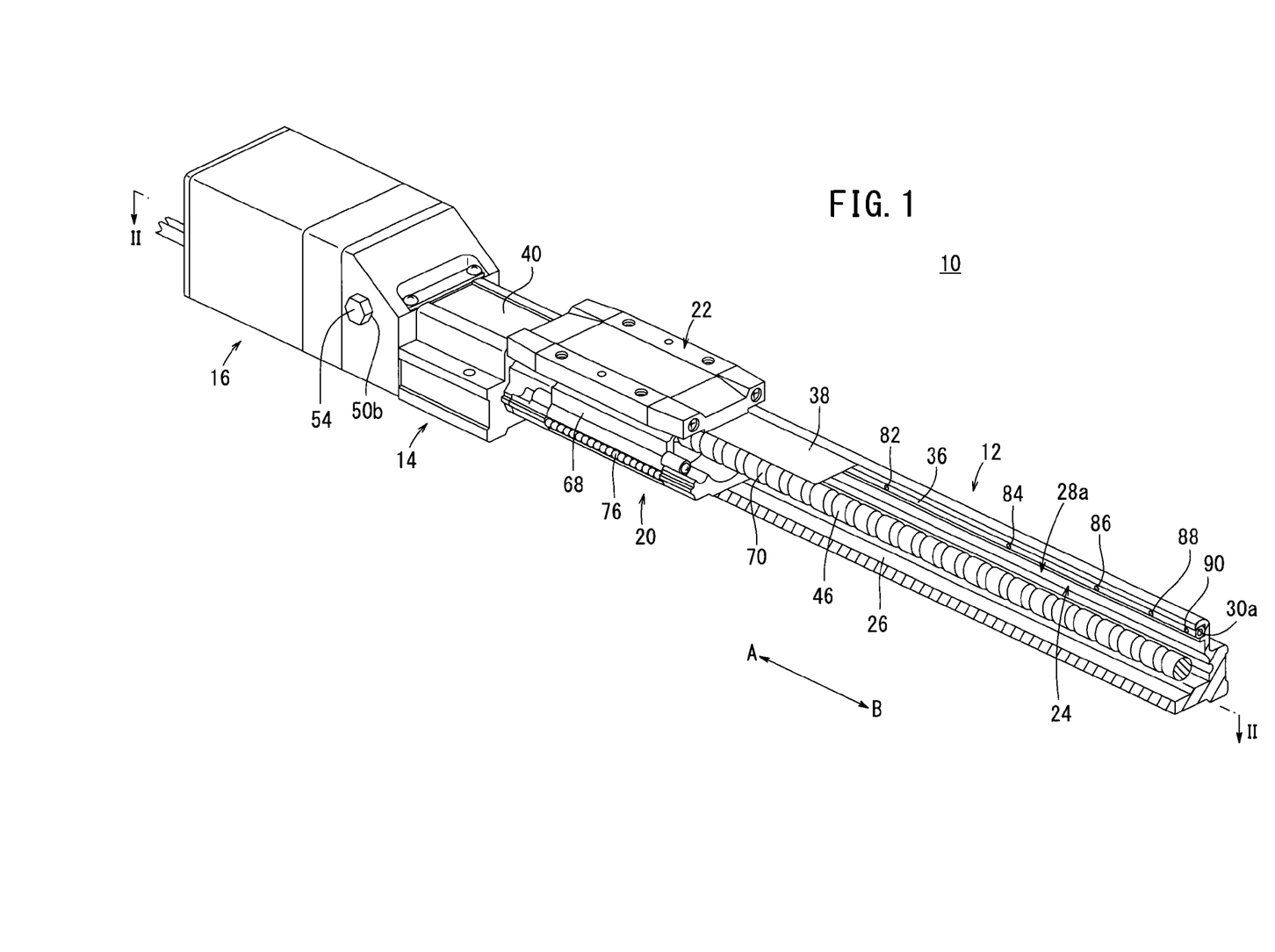
FIG. 1 is a partially cutaway exterior perspective view of an electric actuator according to an embodiment of the present invention.
Figure 2:
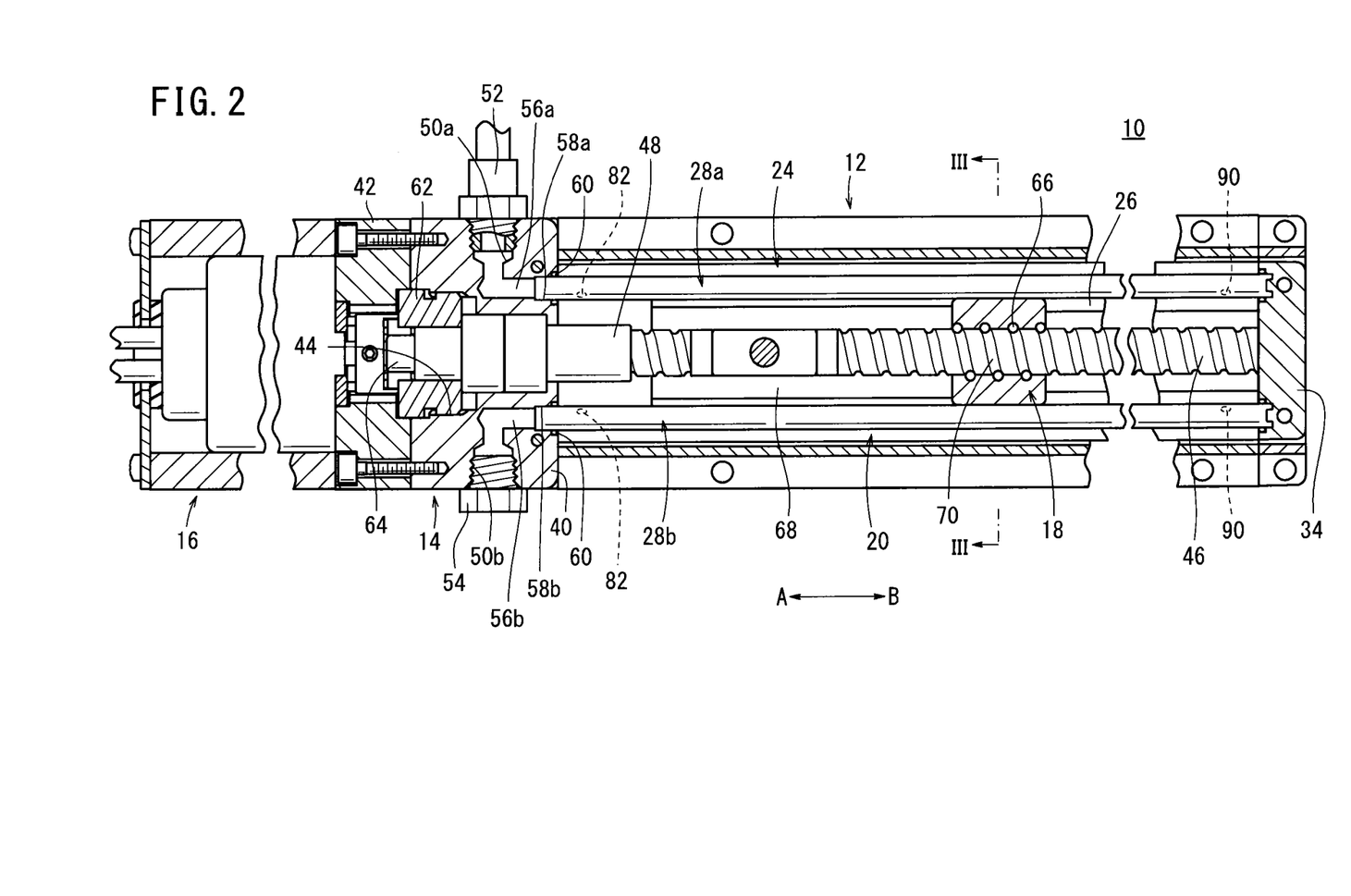
FIG. 2 is a cross sectional view taken along line II-II of FIG. 1.
Figure 3:
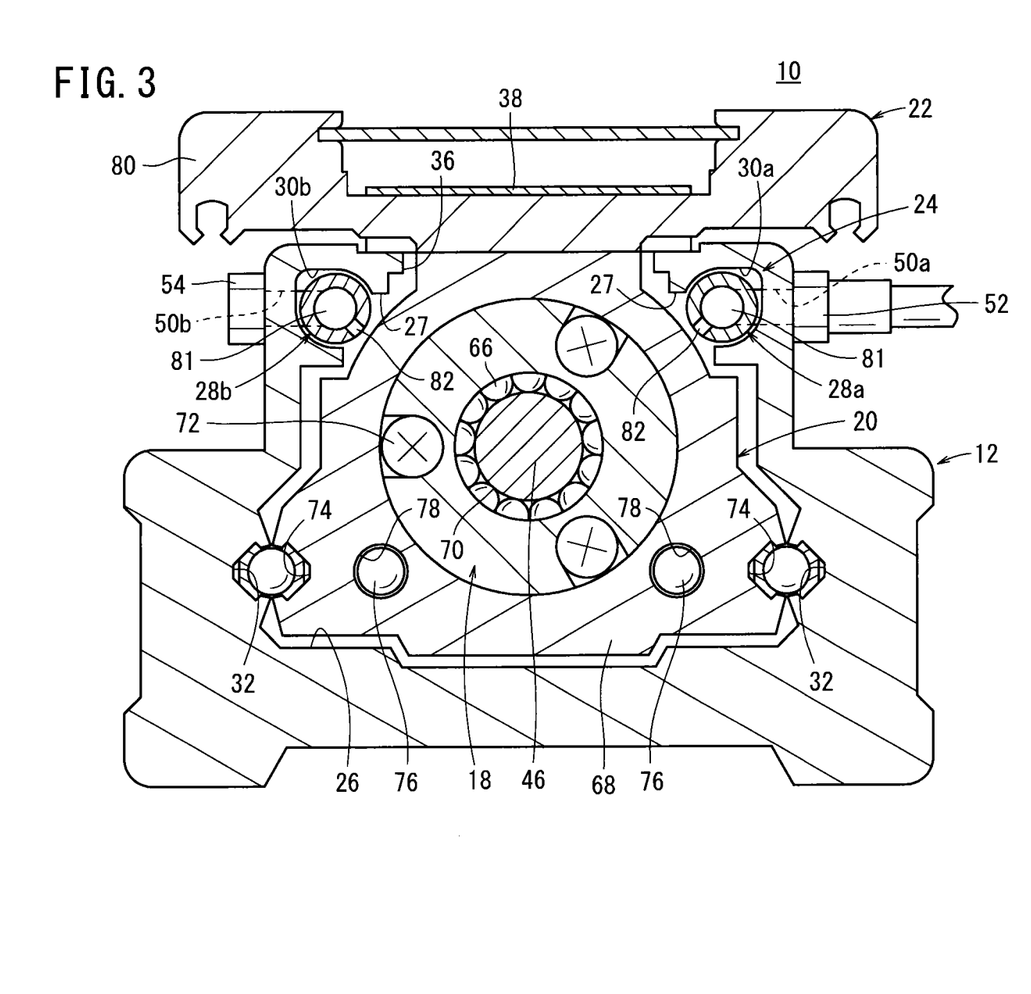
FIG. 3 is a cross sectional view taken along line III-III of FIG. 2.

As shown in FIGS. 1 through 3, an electric actuator 10 includes an elongate body 12 extending in an axial direction (the direction of arrows A and B), a cover unit 14 connected to one end portion of the body 12, a drive unit 16 driven rotatably by an electric signal, which is connected to the body 12 through the cover unit 14, a displacement mechanism 20 disposed in the interior of the body 12 and having a displacement nut (displaceable body) 18 capable of being stroke-displaced by a drive force from the drive unit 16, a slide table 22 connected to the displacement nut 18 and displaced along the body 12, and a dust aspirating mechanism 24 disposed in the interior of the body 12.

The body 12 is formed, for example, with a rectangular shape in cross section with a hole portion 26 formed in the interior thereof that penetrates through the body 12 in the axial direction. A screw shaft 46 of a later-described displacement mechanism 20 is inserted through the hole portion 26, and in upper corner portions of the hole portion 26, two retaining grooves 30a, 30b (see FIG. 3) are formed respectively in which dust collecting pipes (negative pressure supply pipes) 28a, 28b of the dust aspirating mechanism 24 are retained.

The retaining grooves 30a, 30b include openings 27, which open toward the center of the hole portion 26 and extend in the axial direction of the body 12 (the direction of arrows A and B). Further, on inner wall surfaces of the hole portion 26, a pair of first ball grooves 32, in which later-described second balls 76 roll, are formed in straight lines along the axial direction. Further, on the other end of the body 12, an end cover 34 is mounted through non-illustrated bolts so as to cover and block the hole portion 26.

On the other hand, on an upper surface of the body 12, an opened slit 36 is formed along a straight line along the axial direction (the direction of arrows A and B). The slit 36 is covered by a thin plate shaped sealing band 38.

As shown in FIG. 2, the cover unit 14 is made up from an end block 40, which is connected to one end of the body 12, and an adapter 42, which is connected to an end of the end block 40. The drive unit 16 is connected to the adapter 42. The body 12, the end block 40, the adapter 42, and the drive unit 16 are disposed on a straight line.

The end block 40 has a through hole 44 therein that penetrates centrally through the end block 40. A connector 48 that connects the screw shaft 46 and an drive shaft 64 of the drive unit 16 is inserted in the through hole 44. Further, two negative pressure supply ports 50a, 50b, which open in opposite side surfaces perpendicularly to the direction in which the through hole 44 extends (the direction of arrows A and B), are formed in the end block 40. Fittings 52 capable of being connected to non-illustrated pipings are connected to the negative pressure supply ports 50a, 50b. One of the negative pressure supply ports 50a is connected through a pipe to a negative pressure fluid supply source (e.g., a vacuum pump), and the other one of the negative pressure supply ports 50b is blocked and sealed by a sealing plug 54. More specifically, either one of the pair of negative pressure supply ports 50a, 50b is used selectively, whereas the unused negative pressure supply port 50a, 50b is blocked by the sealing plug 54.

The two negative pressure supply ports 50a, 50b are formed perpendicularly to the through hole 44 and for a predetermined depth inwardly on opposite side surfaces of the end block 40, and are connected respectively to communication passages 56a, 56b that extend substantially in parallel with the through hole 44. The communication passages 56a, 56b extend to one end of the end block 40 that faces toward the body 12, and are formed substantially coaxially with the retaining grooves 30a, 30b of the body 12. Further, connection holes 58a, 58b, into which later-described dust collecting pipes 28a, 28b are inserted, are formed respectively in ends of the communication passages 56a, 56b. The connection holes 58a, 58b are expanded in diameter with respect to the communication passages 56a, 56b, and sealing rings 60 are installed via annular grooves on the inner circumferential surfaces thereof (see FIG. 2).

In addition, ends of the dust collecting pipes 28a, 28b, which are installed in the retaining grooves 30a, 30b of the body 12, are inserted into the connection holes 58a, 58b, whereby the communication passages 56a, 56b are connected to and communicate with the dust collecting pipes 28a, 28b. For example, a negative pressure fluid, which is supplied to the negative pressure supply port 50a, flows through the communication passage 56a to the dust collecting pipe 28a. At this time, outer circumferential surfaces of the dust collecting pipes 28a, 28b abut against the sealing rings 60 installed in the connection holes 58a, 58b, whereby leakage of negative pressure fluid between the connection holes 58a, 58b and the dust collecting pipes 28a, 28b is prevented.

A bearing 62, which rotatably supports the drive shaft 64 of the drive unit 16, is mounted in the adapter 42 and is disposed between the drive unit 16 and the end block 40.

The drive unit 16 comprises a rotary drive source (not shown) made up from a DC motor, a stepping motor, or the like, which is rotatably driven by current supplied from a non-illustrated power source. The drive unit 16 is connected to one end of the body 12 through the adapter 42, which is formed on the end of the drive unit 16, together with the drive shaft 64 of the drive unit 16 being connected to the screw shaft 46 through the connector 48. In addition, by rotating the drive shaft 64 under a driving action of the drive unit 16, the connector 48 and the screw shaft 46 are rotated together in unison.

The displacement mechanism 20 includes the screw shaft 46 accommodated in the hole portion 26 of the body 12, the displacement nut 18, which is screw-engaged via the plural first balls 66 with respect to the screw shaft 46, and a connecting member 68 that connects the displacement nut 18 and the slide table 22. The screw shaft 46 is formed in an elongate fashion along the axial direction (the direction of arrows A and B), and a ball screw 70, in which the first balls 66 can roll, is engraved on the outer circumferential surface of the screw shaft 46. One end of the screw shaft 46 is connected through the connector 48 to the drive shaft 64, whereas the other end thereof is supported rotatably with respect to the end cover 34.

The displacement nut 18, for example, is formed in a cylindrical shape and has a helical screw groove engraved on an inner circumferential surface thereof along the axial direction (the direction of arrows A and B). Plural first balls 66 are arranged between the screw groove and the ball screw 70 of the screw shaft 46 that is inserted through the interior of the displacement nut 18.

Further, the displacement nut 18 is inserted into the interior of the connecting member 68 and is connected integrally with the connecting member 68 through a bolt 72. The connecting member 68 includes, on opposite side surfaces thereof that confront the inner wall surface of the body 12, second ball grooves 74, and in the interior of the connecting member 68, two circulation passages 78 are formed (see FIG. 3) in which the second balls 76 that roll in the second ball grooves 74 are circulated. In addition, the second balls 76 are disposed between the second ball grooves 74 of the connecting member 68 and the first ball grooves 32 of the body 12, as well as in the interiors of the circulation passages 78. When the connecting member 68 is moved along the body 12, the second balls 76 are circulated between the first and second ball grooves 32, 74 and into the pair of circulation passages 78.

The slide table 22 includes a table main body 80, the upper surface of which is formed with a flat planar shape, and the connecting member 68 is connected to a lower portion of the table main body 80, the connecting member 68 being movable together with the slide table 22 along the body 12. Further, the sealing band 38 is provided to cover the slit 36 of the body 12, such that when the slide table 22 moves along the body 12, the sealing band 38 moves to separate away from the slit 36.

The dust aspirating mechanism 24 is made up from a pair of dust collecting pipes 28a, 28b arranged in the retaining grooves 30a, 30b of the body 12. The dust collecting pipes 28a, 28b are tubular bodies formed with a constant diameter along the axial direction (the direction of arrows A and B), one end of each of the dust collecting pipes 28a, 28b being inserted respectively into the connecting holes 58a, 58b of the end block 40 to communicate with the communication passages 56a, 56b, and the other ends thereof being sealed by insertion into the end cover 34.

Figure 4:
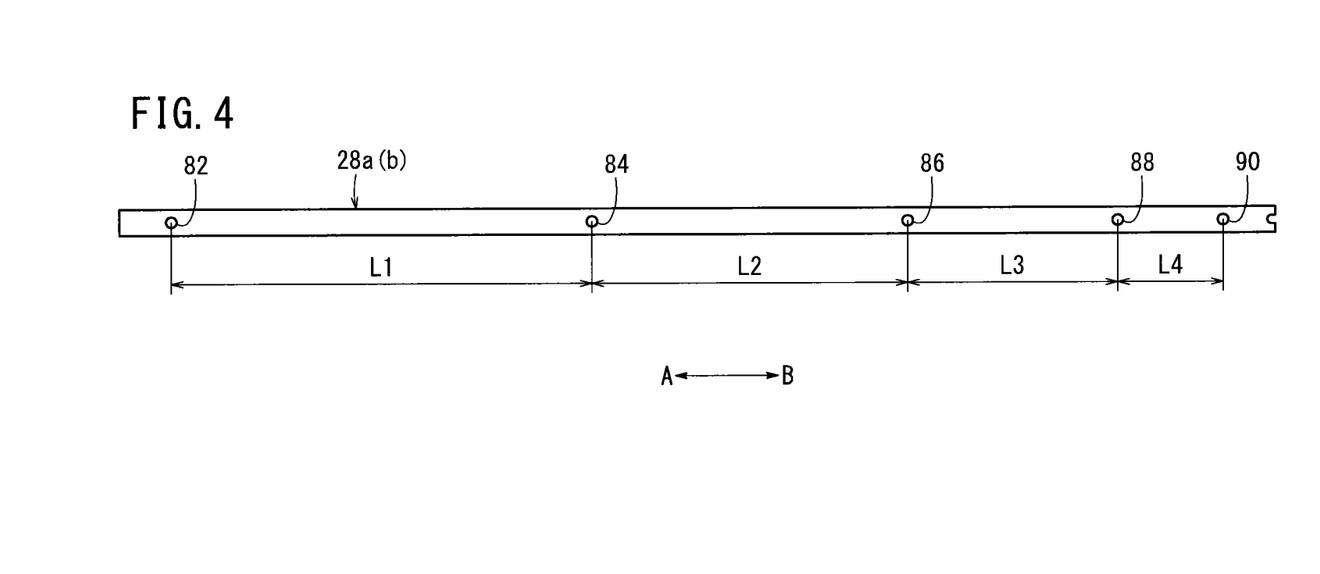
FIG. 4 is a front elevational view of a dust collecting pipe disposed in the electric actuator.

Further, as shown in FIG. 4, plural first through fifth suction holes 82, 84, 86, 88, 90, which communicate with supply passages 81 (see FIG. 3) formed in the interiors of the dust collecting pipes 28a, 28b, are formed on the outer circumferential surfaces of the dust collecting pipes 28a, 28b. The first suction holes 82 are disposed closest to the one end side (in the direction of the arrow A) of the dust collecting pipes 28a, 28b, whereas the fifth suction holes 90 are disposed closest to the other end side (in the direction of the arrow B) of the dust collecting pipes 28a, 28b.

The mutual intervals of separation L1 to L4 between the first through fifth suction holes 82, 84, 86, 88, 90 are set to become progressively smaller stepwise toward the other end side (in the direction of the arrow B) of the dust collection pipes 28a, 28b. The number of suction holes provided in the dust collecting pipes 28a, 28b is not limited to being five in number, as with the aforementioned first through fifth suction holes 82, 84, 86, 88, 90. So long as they are separated mutually along the axial direction (the direction of arrows A and B), and the intervals of separation therebetween are set to become smaller stepwise toward the other end side (in the direction of the arrow B) of the dust collecting pipes 28a, 28b, the number of suction holes is not particularly limited.

More specifically, the interval of separation L1 along the axial direction (the direction of arrows A and B) between the first suction hole 82 and the second suction hole 84 is greatest in size, the interval of separation L2 between the second suction hole 84 and the third suction hole 86, and the interval of separation L3 between the third suction hole 86 and the fourth suction hole 88 are progressively smaller in size, and the interval of separation L4 between the fourth suction hole 88 and the fifth suction hole 90 is smallest in size (L1>L2>L3>L4). The intervals of separation between adjacent suction holes are formed to become smaller stepwise as the intervals are distanced further from the negative pressure supply ports 50a, 50b.

Further, the first through fifth suction holes 82, 84, 86, 88, 90 are formed with substantially constant diameters, for example, by using a single drill to machine and form the first through fifth suction holes 82, 84, 86, 88, 90 in the dust collecting pipes 28a, 28b.

Stated otherwise, in the first through fifth suction holes 82, 84, 86, 88, 90 formed with substantially constant diameters, the intervals of separation between the first through fifth suction holes 82, 84, 86, 88, 90 are set such that, when the negative pressure fluid is supplied from the negative pressure supply ports 50a, 50b to the dust collecting pipes 28a, 28b, dust or the like can be aspirated by supplying the negative pressure fluid to flow evenly along the axial direction (the direction of arrows A and B) of the dust collecting pipes 28a, 28b.

In addition, the dust collecting pipes 28a, 28b are arranged in the retaining grooves 30a, 30b such that the first through fifth suction holes 82, 84, 86, 88, 90 face toward the openings 27 and provide communication between the hole portion 26 of the body 12 and the supply passages 81 through the openings 27 and the first through fifth suction holes 82, 84, 86, 88, 90.

The electric actuator 10 according to the embodiment of the present invention basically is constructed as described above. Next, operations and effects of the electric actuator 10 shall be described.

First, by supplying current to the drive unit 16 from a non-illustrated power source, the drive shaft 64 of the rotary drive source is rotated, and the connector 48 and the screw shaft 46 are driven rotatably in unison. Additionally, by rotating the screw shaft 46, the displacement nut 18, which is screw-engaged via the first balls 66 with the screw shaft 46, is moved in the axial direction by the screw shaft 46. Rotary displacement of the displacement nut 18 is regulated by a non-illustrated rotation stop means, whereby the displacement nut 18 is capable of moving only in the axial direction (the direction of arrows A and B).

In addition, the connecting member 68, which is connected to the displacement nut 18, and the slide table 22, which is connected to the connecting member 68, are moved integrally along the body 12, and reach displacement terminal end positions upon arriving at one end or the other end of the body 12. At this time, accompanying movement of the slide table 22 and the connecting member 68, the second balls 76 are circulated between the first ball grooves 32 of the body 12 and the second ball grooves 74 of the connecting member 68, as well as in the circulation passages 78.

Next, a case shall be described in which dust generated in the interior of the body 12 is aspirated by the dust aspirating mechanism 24.

During operation of the aforementioned electric actuator 10, from a non-illustrated negative pressure fluid supply source, a negative pressure fluid is supplied to the supply passage 81 of the dust collecting pipe 28a through the negative pressure supply port 50a and the communication passage 56a. The negative pressure fluid flows from the one end side of the dust collecting pipe 28a on the side of the negative pressure supply port 50a to the other end side thereof (in the direction of the arrow B), whereby the negative pressure fluid is supplied respectively to the hole portion 26 of the body 12 while passing in succession through the first suction hole 82 disposed on the one end side, the second through fourth suction holes 84, 86, 88, and the fifth suction hole 90 disposed on the other end side.

Consequently, dust or the like generated in the hole portion 26 of the body 12 is aspirated into the supply passage 81 through the first through fifth suction holes 82, 84, 86, 88, 90. Additionally, dust or the like sucked into the dust collecting pipe 28a is discharged to the exterior of the electric actuator 10 through the communication passage 56a and the negative pressure supply port 50a.

Further, because the first through fifth suction holes 82, 84, 86, 88, 90 of the dust collecting pipe 28a are arranged so that the intervals between adjacent suction holes become smaller (narrower) as the holes are distanced further from the negative pressure supply port 50a, even at the other end side (in the direction of the arrow B) of the dust collecting pipe 28a where it is difficult for the negative pressure fluid to reach and be delivered, pressure fluid can be supplied and dust can be aspirated reliably, for example, through the fifth and fourth suction holes 90, 88 having a tightly disposed interval therebetween. More specifically, in the interior of the body 12, because dust or the like can be aspirated reliably and evenly along the axial direction of the dust collecting pipe 28a, removal of dust or the like from the interior of the body 12 can be performed uniformly without variation along the axial direction of the body 12.

In the above description, a case has been described in which among the pair of negative pressure supply ports 50a, 50b, only one negative pressure supply port 50a is used to supply the negative pressure fluid. However, the present invention is not limited to this feature, and the pair of negative pressure supply ports 50a, 50b, for example, may be connected respectively to the negative pressure supply source to supply negative pressure fluid, whereby dust or the like can be aspirated respectively from both of the dust collecting pipes 28a, 28b. Owing thereto, even in a high speed driving situation in which the displacement nut 18 and the slide table 22 are driven at high speeds, dust or the like can be aspirated without delay, and dust or the like can be aspirated quickly through the pair of dust collecting pipes 28a, 28b and prevented from leaking to the exterior of the body 12, responsive to movement of the displacement nut 18 and the slide table 22. Further, by performing aspiration through two dust collecting pipes 28a, 28b, compared to the case of performing aspiration with a single dust collecting pipe 28a (28b), a greater amount of dust or the like can be aspirated and discharged.

In the foregoing manner, with the present embodiment, the tubular dust collecting pipes 28a, 28b are disposed in the hole portion 26 of the body 12 that constitutes the electric actuator 10, and plural first through fifth suction holes 82, 84, 86, 88, 90 are provided in the dust collecting pipes 28a, 28b, such that the intervals of separation therebetween become gradually smaller as the suction holes are spaced further away from the negative pressure supply ports 50a, 50b through which the negative pressure fluid is supplied. Further, dust or the like generated in the hole portion 26 of the body 12 is aspirated from the first through fifth suction holes 82, 84, 86, 88, 90 and through the dust collecting pipes 28a, 28b. At this time, because intervals of separation between the suction holes are arranged to become smaller stepwise toward the other end side (in the direction of the arrow B) of the dust collecting pipes 28a, 28b remote from the negative pressure supply ports 50a, 50b, dust or the like can be aspirated and removed reliably and uniformly along the axial direction of the body 12.

Further, in the dust collecting pipes 28a, 28b, by arranging the first through fifth suction holes 82, 84, 86, 88, 90 respectively to have different intervals of separation therebetween, dust or the like can be aspirated efficiently using a negative pressure fluid with a small flow rate. Stated otherwise, for example, in the structure according to the conventional technique, by increasing the flow rate of the negative pressure fluid, the negative pressure fluid can be made to flow to the distal end of the dust collecting pipe, and the sucking force by which the dust or the like is aspirated can be increased. However, because a large flow rate for the negative pressure fluid is needed, the negative pressure fluid is used wastefully. In contrast thereto, with the present invention, the intervals of separation between the first through fifth suction holes 82, 84, 86, 88, 90 are arranged so as to differ respectively from each other, and thus a negative pressure fluid with a low flow rate can be used efficiently to aspirate dust or the like, thereby enabling energy savings.

Furthermore, because the plural first through fifth suction holes 82, 84, 86, 88, 90 each are formed with substantially the same diameter in the dust collecting pipes 28a, 28b, the suction holes can be formed easily using a single drill, and thus manufacturing of the suction holes can be improved and facilitated.

Still further, because the first through fifth suction holes 82, 84, 86, 88, 90 of the dust collecting pipes 28a, 28b are arranged in the hole portion 26 of the body 12 in the vicinity of the first and second balls 66, 76 where dust or the like is easily generated, the dust or the like, which is generated by rolling movement of the first and second balls 66, 76, can be aspirated and removed more reliably.

Still further, because the dust collecting pipes 28a, 28b are disposed in the body 12 and are not exposed to the exterior, dust and the like generated in the interior of the body 12 can reliably be aspirated and drawn into the dust collecting pipes 28a, 28b, whereby the dust and the like can reliably be prevented from leaking out to the exterior of the body 12.

Further, the cover unit 14 is connected to one end of the body 12, the end cover 34 is mounted on the other end of the body 12, and the upwardly opened slit 36 is covered and blocked by the sealing band 38. Thus, because open regions of the body 12 can be blocked reliably, dust or the like generated in the interior of the body 12 is prevented from leaking out to the exterior from the body 12.

The electric actuator according to the present invention is not limited to the aforementioned embodiment, and it is a matter of course that various additional or modified structures may be adopted therein without deviating from the essential gist of the present invention.

What is claimed is:

1. An electric actuator comprising:
a body;
a drive unit which is driven rotatably upon being energized by an electric current;
a displacement mechanism disposed in the body and including a screw shaft rotated by a drive force of the drive unit, a displaceable body screw-engaged with the screw shaft and displaced along an axial direction of the body, and a plurality of circulating balls that support the displaceable body displaceably with respect to the body;
a negative pressure supply port formed in the body and to which a negative pressure fluid is supplied; and
a negative pressure supply pipe disposed in an interior of the body and into which the negative pressure fluid is supplied from the negative pressure supply port,
wherein the negative pressure supply pipe includes at least three suction holes separated mutually along the axial direction, distances between adjacent suction holes are set to become smaller stepwise as the suction holes are distanced further from the negative pressure supply port, and the suction holes are arranged so as to open in a passage between the body and the displaceable body that is directly connected to a circulation path of the plurality of circulating balls.

2. The electric actuator according to claim 1, wherein diameters of the suction holes are substantially the same.

3. The electric actuator according to claim 1, wherein the negative pressure supply pipe comprises two negative pressure supply pipes disposed as a pair and separated mutually from each other in the interior of the body.

4. The electric actuator according to claim 1, wherein the suction holes open in a direction toward the displacement mechanism.

5. The electric actuator according to claim 3, wherein the suction holes in one of the negative pressure supply pipes and the suction holes in another of the negative pressure supply pipes open respectively toward a shaft center of the screw shaft.

6. The electric actuator according to claim 1, wherein the negative pressure supply pipe is constituted from a pipe body formed with a constant diameter along the axial direction.

7. The electric actuator according to claim 1, wherein the negative pressure supply port comprises two negative pressure supply ports disposed as a pair on opposite side surfaces along the axial direction of the body, either one of the negative pressure supply ports being used selectively.

8. The electric actuator according to claim 1, wherein the negative pressure supply port comprises two negative pressure supply ports disposed as a pair on opposite side surfaces along the axial direction of the body, the negative pressure fluid being supplied respectively to the negative pressure supply ports.

9. The electric actuator according to claim 1, wherein the negative pressure supply pipe is held in a retaining groove formed in an upper corner portion in the interior of the body.

10. The electric actuator according to claim 1, wherein the displaceable body includes a sealing cover that covers a slit in an upper surface of the body along the axial direction of the body, and the sealing cover is movable with the displaceable body.

* * * * *